(12) United States Patent
Mitsumoto et al.

(10) Patent No.: US 10,619,068 B2
(45) Date of Patent: Apr. 14, 2020

(54) TRANSPARENT HEAT SHIELDING AND INSULATING MEMBER, AND METHOD FOR PRODUCING THE SAME

(71) Applicant: HITACHI MAXELL, LTD., Ibaraki-shi, Osaka (JP)

(72) Inventors: Yoshimasa Mitsumoto, Osaka (JP); Noriaki Otani, Osaka (JP)

(73) Assignee: Maxell Holdings, Ltd., Kyoto (JP)

( * ) Notice: Subject to any disclaimer, the term of this patent is extended or adjusted under 35 U.S.C. 154(b) by 603 days.

(21) Appl. No.: 14/794,027

(22) Filed: Jul. 8, 2015

(65) Prior Publication Data

US 2016/0009923 A1 Jan. 14, 2016

(30) Foreign Application Priority Data

Jul. 9, 2014 (JP) ................... 2014-141827

(51) Int. Cl.
*C09D 5/00* (2006.01)
*C09D 123/26* (2006.01)
*G02B 1/14* (2015.01)
*C09D 151/06* (2006.01)
*G02B 5/20* (2006.01)
*C09D 4/06* (2006.01)

(52) U.S. Cl.
CPC ......... *C09D 123/26* (2013.01); *C09D 151/06* (2013.01); *G02B 1/14* (2015.01); *G02B 5/208* (2013.01); *C09D 4/06* (2013.01)

(58) Field of Classification Search
CPC ...... C09D 5/002; C09D 123/26; C09D 5/004; G02B 1/14; C23C 14/34; C23C 14/086
See application file for complete search history.

(56) References Cited

U.S. PATENT DOCUMENTS

| 2006/0269733 | A1 | 11/2006 | Mizuno et al. |
| 2009/0279170 | A1* | 11/2009 | Miyazaki ............ G02B 5/3025 359/485.01 |
| 2010/0035057 | A1* | 2/2010 | Ishida .................. C08L 51/06 428/353 |
| 2012/0003436 | A1 | 1/2012 | Saie et al. |
| 2013/0279000 | A1 | 10/2013 | Maeda et al. |

(Continued)

FOREIGN PATENT DOCUMENTS

| JP | H11295503 A | 10/1999 |
| JP | 2005-343113 A | 12/2005 |
| JP | 2013-10341 A | 1/2013 |

(Continued)

OTHER PUBLICATIONS

Machine translation of Office Action dated Jan. 23, 2018, issued in Japanese Patent Application No. 2014-141827.

*Primary Examiner* — Samir Shah
(74) *Attorney, Agent, or Firm* — Westerman, Hattori, Daniels & Adrian, LLP

(57) ABSTRACT

A transparent heat shielding and insulating member of the present invention includes a transparent base and a functional layer formed on the transparent base. The functional layer includes an infrared reflecting layer, a primer layer and a protective layer laminated in this order from the transparent base side. The primer layer is formed of a modified polyolefin resin having an acid group or a hydroxyl group, and the protective layer is formed of an ionizing radiation curable resin or a thermosetting resin.

6 Claims, 1 Drawing Sheet

(56) References Cited

U.S. PATENT DOCUMENTS

| | | |
|---|---|---|
| 2015/0190989 A1 | 7/2015 | Inuduka et al. |
| 2016/0003989 A1 | 1/2016 | Watanabe et al. |

FOREIGN PATENT DOCUMENTS

| | | |
|---|---|---|
| JP | 2013-151103 A | 8/2013 |
| JP | 2014-141015 A | 8/2014 |
| JP | 2014-167617 A | 9/2014 |
| JP | 2014-170171 A | 9/2014 |
| JP | 2015-158687 A | 9/2015 |
| WO | 2012/096304 A1 | 7/2012 |
| WO | 2014049891 A1 | 4/2014 |
| WO | 2014/119677 A1 | 8/2014 |

\* cited by examiner

TRANSPARENT HEAT SHIELDING AND INSULATING MEMBER, AND METHOD FOR PRODUCING THE SAME

BACKGROUND OF THE INVENTION

1. Field of the Invention

The present invention relates to a transparent heat shielding and insulating member and a method for producing the same.

2. Description of Related Art

From the viewpoint of global warming prevention and energy saving, it has been a trend to shield heat rays of sunshine (infrared ray) that enter through windows of buildings, display windows, windows of automobiles and the like, so as to lower the internal temperatures. Recently, from the viewpoint of energy saving, heat shielding and insulating members have been proposed and have appeared on the market. Such heat shielding and insulating members are provided with not only a heat shielding property for shielding heat rays that will raise internal temperature in the summer, but also a heat insulating function to suppress the leakage of heat from heating equipment indoors in the winter, thereby reducing heating load.

JP 2013-010341A discloses an infrared reflecting film formed by laminating sequentially a reflecting layer and a protective layer on one surface of a base. In JP 2013-010341A, the protective layer is composed of an olefin-based resin layer, to be laminated on the reflecting layer, and a hard coat layer that is laminated on the olefin-based resin layer so as to make an outermost layer. The olefin-based resin layer is set to have a thickness in a range of 5 to 30 μm. However, since the protective layer is laminated on the reflecting layer via an adhesive layer, if the material or the thickness of the adhesive layer is inappropriate, the adhesive layer may absorb infrared rays, causing degradation of the heat insulation performance of the infrared reflecting film. Furthermore, when the film is put in a hot and humid state for a long time, an inactive olefin-based resin may peel off from the adhesive layer.

JP 2013-151103A discloses a transparent laminated film (infrared reflecting film) having a protective layer of silicon oxide formed outside a transparent laminated part, which is transparent and which has a heat shielding and insulating function (infrared reflecting layer) and also a squeegee stress relief layer of an olefin-based resin interposed between the transparent laminated part and the protective layer. However, since the squeegee stress relief layer is adhered to the surface of the transparent laminated part via an adhesive layer, the adhesive layer may absorb infrared rays so as to degrade the heat insulation performance of the infrared reflecting film if the material or the thickness of the adhesive layer is inappropriate, such as in the case of JP 2013-010341A. Furthermore, when the film is put in a hot and humid state for a long time, an inactive olefin-based resin may peel off from the adhesive layer.

JP 2005-343113A discloses a sunshine shielding film formed by laminating an aluminum vapor deposition layer and a hard coat layer, in this order, on one surface of a polyester film. However, since the thickness of the hard coat layer is set to be in a range of 0.5 to 30 μm, in a case where the hard coat layer is formed of a material that has a greater infrared absorbency, such as an acrylic resin including an ester bond or a urethane bond or the like, infrared ray will be absorbed more by the hard coat layer when the thickness of the hard coat layer is increased, and it may cause deterioration in the heat insulation performance of the sunshine shielding film. Moreover, the ionizing radiation curable resin experiences greater shrinkage by curing. Therefore, in a case where the hard coat layer is formed of the ionizing radiation curable resin, when the ionizing radiation curable resin is coated directly on the aluminum vapor deposition layer as an metal layer, the adhesion between the metal layer and the hard coat layer is degraded to cause peeling of the hard coat layer.

WO 2012/096304A discloses a far infrared reflecting laminate comprising a substrate, a far infrared reflecting layer and a hard coat layer disposed in this order. In WO 2012/096304, since the hard coat layer includes a crosslinked resin having at least one polar group selected from the group consisting of a phosphoric acid group, a sulfonic acid group and an amide group, the adhesion is improved by the interaction with the far infrared reflecting layer formed of a metal layer, a metal oxide layer or the like. However, when the hard coat layer is exposed for a long time to rays including ultraviolet ray, adhesion with the far infrared reflecting layer may deteriorate due to deterioration or the like of the crosslinked resin.

SUMMARY OF THE INVENTION

In order to solve the above-described problems, the present invention provides a transparent heat shielding and insulating member including a protective layer that has excellent abrasion resistance and adhesion. The transparent heat shielding and insulating member is obtained by forming the protective layer of a particular resin and also interposing a primer layer of a particular resin between the protective layer and an infrared reflecting layer.

After keen studies on the aforementioned primer layer for solving the above-described problems, the inventors have found that a modified polyolefin resin having an acid group or a hydroxyl group has excellent adhesion to both of the infrared reflecting layer and the protective layer. Thereby, abrasion resistance of the protective layer can be ensured, and increase of normal emittance and thermal transmittance of the transparent heat shielding and insulating member can be suppressed. And thus the present invention is obtained.

The transparent heat shielding and insulating member of the present invention includes a transparent base and a functional layer formed on the transparent base. The functional layer includes an infrared reflecting layer, a primer layer and a protective layer laminated in this order from the transparent base side. The primer layer is formed of a modified polyolefin resin having an acid group or a hydroxyl group, and the protective layer is formed of an ionizing radiation curable resin or a thermosetting resin.

A method for producing a transparent heat shielding and insulating member of the present invention includes the following steps: forming an infrared reflecting layer on a transparent base, forming a primer layer on the infrared reflecting layer by applying a coating liquid for primer layer formation, and forming a protective layer on the primer layer by applying a coating liquid for protective layer formation including a ionizing radiation curable resin oligomer having a weight average molecular weight in a range of 10,000 to 100,000 and then irradiating with ionizing radiation.

According to the present invention, it is possible to provide a transparent heat shielding and insulating member having a protective layer excellent in abrasion resistance and adhesion, and having excellent heat shielding function and heat insulating function. Further according to the present invention, it is possible to provide a method for producing a transparent heat shielding and insulating member excellent in coating property of a coating liquid for forming a primer layer.

DETAILED DESCRIPTION OF THE INVENTION

A transparent heat shielding and insulating member of the present invention includes a transparent base and a functional layer formed on the transparent base. The functional layer includes an infrared reflecting layer, a primer layer and a protective layer laminated in this order from the transparent base side. The primer layer is formed of a modified polyolefin resin having an acid group or a hydroxyl group, and the protective layer is formed of an ionizing radiation curable resin or a thermosetting resin.

The transparent heat shielding and insulating member of the present invention configured as described above, has a protective layer excellent in abrasion resistance and adhesion, and the member has excellent heat shielding function and heat insulating function.

Hereinafter, the transparent heat shielding and insulating member of the present invention will be described with reference to attached drawings.

Figure 1:
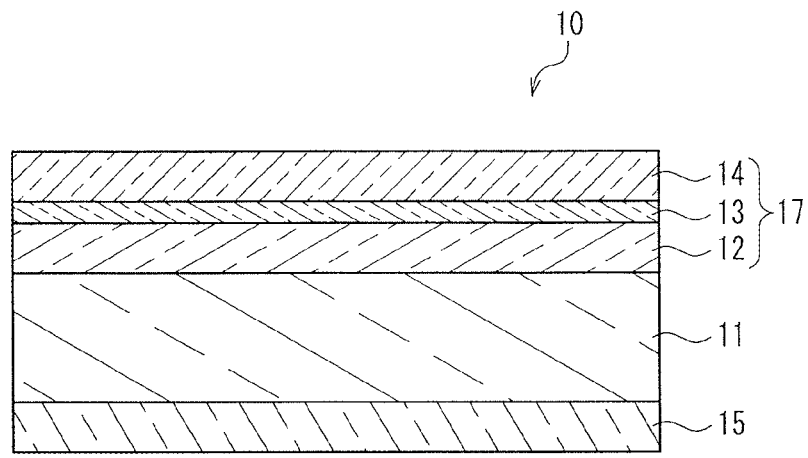
FIG. 1 is a schematic cross-sectional view showing an example of transparent heat shielding and insulating member of the present invention.
Figure 2:
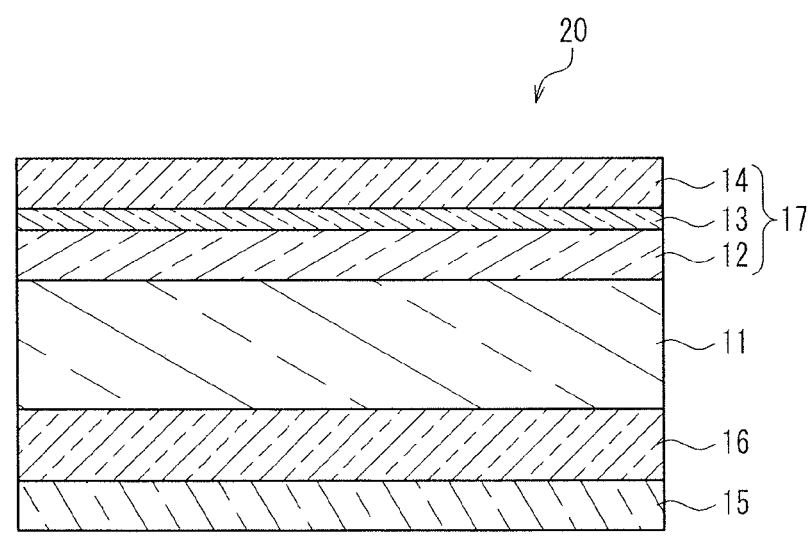
FIG. 2 is a schematic cross-sectional view showing another example of transparent heat shielding and insulating member of the present invention.

FIG. 1 is a schematic cross-sectional view showing an example of transparent heat shielding and insulating member of the present invention. In FIG. 1, a transparent heat shielding and insulating member 10 of the present invention includes a transparent base 11, an infrared reflecting layer, 12, a primer layer 13, a protective layer 14, and an adhesive layer 15. The infrared reflecting layer 12, the primer layer 13 and the protective layer 14 constitute a functional layer 17. FIG. 2 is a schematic cross-sectional view showing another example of transparent heat shielding and insulating member of the present invention. In FIG. 2, a transparent heat shielding and insulating member 20 of the present invention includes a transparent base 11, an infrared reflecting layer, 12, a primer layer 13, a protective layer 14, an adhesive layer 15, and a cholesteric liquid crystal layer 16. The infrared reflecting layer 12, the primer layer 13 and the protective layer 14 constitute a functional layer 17. Namely, the transparent heat shielding and insulating member as shown in FIG. 2 further includes a cholesteric liquid crystal layer 16 interposed between the transparent base 11 and the adhesive layer 15 in the transparent heat shielding and insulating member as shown in FIG. 1.

<Protective Layer>

The protective layer is formed of an ionizing radiation curable resin or a thermosetting resin. Thereby, the abrasion resistance of the protective layer can be improved.

Preferably, the thickness of the protective layer is in a range of 0.1 μm to 2.5 μm, and more preferably 0.5 μm to 1.5 μm. When the thickness of the protective layer is within this range, even if the ionizing radiation curable resin or the thermosetting resin for forming the protective layer is a resin that absorbs a part of the infrared ray, the absorption of the infrared ray is suppressed, and thus it is possible to suppress degradation in heat insulation of the transparent heat shielding and insulating member of the present invention.

In general, if a protective layer that is as thin as 0.1 μm to 2.5 μm is disposed directly on a infrared reflecting layer, adhesion to the infrared reflecting layer deteriorates, and thus it is difficult to provide sufficient abrasion resistance to the protective layer. However, in the present invention, due to the effect provided by the primer layer as described below, even when the protective layer is as thin as 0.1 μm to 2.5 μm, excellent adhesion to the infrared reflecting layer is obtained, and the hardness of the protective layer is ensured to improve the abrasion resistance.

It is preferable that the normal emittance at the protective layer side, based on Japanese Industrial Standards (JIS) R3106, is 0.3 or less. When the normal emittance is 0.3 or less, infrared ray absorption is small, and thus the heat insulation performance of the transparent heat shielding and insulating member of the present invention can be ensured.

[Ionizing Radiation Curable Resin]

A protective layer of the ionizing radiation curable resin is formed by irradiating an ionizing radiation curable resin oligomer or an ionizing radiation curable resin monomer with ionizing radiation so as to cure the oligomer or the monomer.

It is preferable that the weight average molecular weight of the ionizing radiation curable resin oligomer is in a range of 10,000 to 100,000. When the weight average molecular weight is within the above-described range, the coating property of the coating liquid for protective layer formation used for forming the protective layer is improved, and at the same time, the abrasion resistance of the thus formed protective layer can be improved. In the present invention, the weight average molecular weight of the oligomer is measured by GPC (Gel Permeation Chromatography).

That is, if the weight average molecular weight is less than 10,000, a defect named as cissing may be caused when coating the coating liquid for protective layer formation on a primer layer of the below-described modified polyolefin resin. If the weight average molecular weight is more than 100,000, in general, the number of unsaturated bond groups per molecular weight is decreased. As a result, the cross-linking density of the coating film is decreased, and the protective layer may not be able to sufficiently exhibit its abrasion resistance, since the unsaturated bond group makes a reactive site at the time of curing by ionizing radiation.

For the ionizing radiation curable resin oligomer having a weight average molecular weight in a range of 10,000 to 100,000, for example, a polyfunctional acrylate oligomer such as urethane-based, epoxy-based, and polyester-based can be used. Among them, a urethane-based polyfunctional acrylate oligomer is preferred since a protective layer formed of the oligomer has a good balance of hardness and flexibility. The urethane-based polyfunctional acrylate oligomer is obtained, for example, by reacting urethane acrylate having principal chain skeleton of an acrylate polymer and having a reactive acryloyl group at its terminal.

For the polyfunctional acrylate oligomer, a commercial product can be used. The examples include "BPZA-66", "BPZA-100" (trade name) manufactured by Kyoeisha Chemical Co., Ltd.; "Acrit 8KX-012C", "8KX-077" (trade name) manufactured by Taisei Fine Chemical Co., Ltd.; "Hitaloid 7975", "Hitaloid 7975D", "Hitaloid 7988" (trade name) manufactured by Hitachi Chemical Co., Ltd.; and, "ACA-200M", "ACA-230AA", "ACA-Z250", "ACA-Z251", "ACA-Z300" and "ACA-Z320" (trade name) manufactured by DAICEL-ALLNEX LTD.

The above-described ionizing radiation curable resin oligomer can be replaced by an ionizing radiation curable resin monomer as long as the film formability of the coating liquid for protective layer formation on the primer layer does not deteriorate. For example, a polyfunctional acrylate monomer or the like having two or more unsaturated groups can be used. Specific examples thereof include: acrylates such as ethylene glycol di(meth)acrylate, diethylene glycol di(meth)acrylate, triethylene glycol di(meth)acrylate, 1,4-cyclohexanediacrylate, pentaerythritoltetra(meth)acrylate, pentaerythritoltri(meth)acrylate, trimethylolpropanetri(meth)acrylate, trimethylolethanetri(meth)acrylate, dipentaerythritoltetra(meth)acrylate, dipentaerythritolpenta(meth)acrylate, dipentaerythritolhexa(meth)acrylate, and, 1,2,3-cyclohexanetrimethacrylate; polyurethanepolyacrylates such as pentaerythritoltriacrylatehexamethylenediisocyanate urethane prepolymer; esters such as polyester polyacrylate generated from polyhydric alcohols and (meth)acrylic acid; vinylbenzenes such as 1,4-divinylbenzene, 4-vinylbenzoate-2-acryloylethylester, and, 1,4-divinylcyclohexanone, and the derivatives thereof.

It is also possible to use the ionizing radiation curable resin monomer as a mixture with the ionizing radiation curable resin oligomer.

[Thermosetting Resin]

Examples of the above-described thermosetting resin include silicone resin, phenolic resin, urea resin, diallyl phthalate resin, melamine resin, unsaturated polyester resin, polyurethane resin, and epoxy resin. The protective layer of the thermosetting resin is formed by curing a thermosetting resin precursor with heat.

For the purpose of improving the hardness of the formed protective layer, a silicone resin precursor is used preferably for the thermosetting resin precursor. Among the silicone resin precursors, a thermosetting resin precursor formed of an alkoxysilane-based compound is the most preferred.

Examples of the thermosetting resin precursor of an alkoxysilane-based compound include "KP-86" (trade name) manufactured by Shin-Etsu Silicone; and, "SHC-900" and "TOSGAURD 510" (trade name) manufactured by Momentive Performance Materials Japan LLC.

<Primer Layer>

The primer layer is composed of a modified polyolefin resin having either an acid group or a hydroxyl group. Thereby, adhesion between the protective layer and the infrared reflecting layer can be improved. Further, since the principal component of the modified polyolefin resin is polyolefin, it absorbs much less light of the infrared region wavelength in comparison with an acrylic resin, a polyurethane-based resin, a polyester-based resin, a silicone-based resin and the like. As a result, it can suppress an increase in the normal emittance and thermal transmittance.

It is particularly preferable that the primer layer is formed of a modified polyolefin resin having an acid group, since the adhesion of the primer layer can be improved further. Alternatively, the primer layer can be formed of a modified polyolefin resin having a hydroxyl group as long as the adhesion of the primer layer does not deteriorate.

Although there is no particular limitation on the polyolefin resin to make the skeleton of the modified polyolefin resin, polypropylene and polypropylene-α-olefin copolymer are used preferably. Examples of the α-olefin of the polypropylene-α-olefin copolymer include ethylene, 1-butene, 1-heptene, 1-octene, and 4-methyl-1-pentene, which can be used alone or with any other olefins. Although there is no particular limitation on the rate of the polypropylene in the polypropylene-α-olefin copolymer, from the viewpoint of solubility with respect to an organic solvent, the rate is preferably 50 mol % or more and 90 mol % or less.

Although there is no particular limitation, the above-described modified polyolefin resin having an acid group can be obtained for example through acid modification by subjecting the polyolefin resin to graft copolymerization with at least one of α,β-unsaturated carboxylic acid and the acid anhydride. Although there is no particular limitation, examples of the α,β-unsaturated carboxylic acid and the acid anhydride include maleic acid, itaconic acid, citraconic acid, fumaric acid, aconitic acid, crotonic acid, isocrotonic acid, acrylic acid and the anhydrides, which may be used alone or as a combination of at least two. Among them, from the viewpoint of a general purpose application, it is preferable that at least one of maleic acid anhydride or itaconic acid anhydride is graft-copolymerized with the polyolefin resin and modified.

The contents of graft copolymerization of α,β-unsaturated carboxylic acid and the acid anhydrides with respect to the polyolefin resin is preferably in a range of 0.2 to 30 mass %, and more preferably 1.0 to 10.0 mass %. When the content of the graft copolymerization is less than 0.2 mass %, solubility with respect to the organic solvent is decreased to degrade the stability as a coating liquid for primer layer formation, and adhesion with the infrared reflecting layer may be insufficient. To the contrary, when it exceeds 30 mass %, absorption of light in an infrared region wavelength begins to increase, which may result in the increase in the normal emittance and thermal transmittance.

The modified polyolefin resin having an acid group as described above can be produced by any known methods such as a fusion method or a solution method.

It is also possible to subject the modified polyolefin resin having an acid group to an acrylic modification by further adding a (meth)acrylic acid-based monomer, thereby further improving the solubility with respect to a polar solvent and adhesion, and compatibility with a hard coat agent or the like. Specifically, the resin can be obtained by allowing to react a compound containing an unsaturated bond, having a functional group (a hydroxyl group or a glycidyl group) that reacts, with an acid-modified part of the above-described modified polyolefin resin having an acid group so as to introduce a double bond, thereafter graft-copolymerizing a (meth)acrylic monomer.

Preferred examples of the compound containing an unsaturated bond include 2-hydroxyethyl acrylate, 2-hydroxypropyl acrylate, 4-hydroxybutyl acrylate, polypropylene glycol acrylate, 2-hydroxyethyl methacrylate, 2-hydroxypropyl methacrylate, 4-hydroxybutyl methacrylate, polypropylene glycol methacrylate, glycidyl acrylate, and glycidyl methacrylate. It is preferable that the compound containing a unsaturated bond is used in a content of 10 to 90 mass % with respect to the modified polyolefin resin having an acid group.

A (meth)acrylic monomer is graft-copolymerized after introduction of a double bond to a modified polyolefin resin having an acid group. Examples of the (meth)acrylic monomer are (meth)acrylic acids and (meth)acrylates. An example of the (meth)acrylic acid is at least one of acrylic acid and methacrylic acid. Examples of the (meth)acrylate include methyl acrylate, ethyl acrylate, propyl acrylate, n-butyl acrylate, isobutyl acrylate, t-butyl acrylate, 2-ethylhexyl acrylate, lauryl acrylate, stearyl acrylate, 2-hydroxyethyl acrylate, 2-hydroxypropyl acrylate, 4-hydroxybutyl acrylate, glycidyl acrylate, cyclohexyl acrylate, polypropylene glycol acrylate, methyl methacrylate, ethyl methacrylate, propyl methacrylate, n-butyl methacrylate, isobutyl methacrylate, t-butyl methacrylate, 2-ethylhexyl methacrylate, lauryl methacrylate, stearyl methacrylate, 2-hydroxyethyl methacrylate, 2-hydroxypropyl methacrylate, 4-hydroxybutyl methacrylate, glycidyl methacrylate, cyclohexyl methacrylate, and polypropylene glycol methacrylate. These (meth)acrylic acid-based monomers can be used alone or as a mixture of at least two.

The modified polyolefin resin having a hydroxyl group can be obtained by introducing a double bond into a modified polyolefin resin having an acid group, and then graft-copolymerizing a (meth)acrylic acid-based monomer containing a hydroxyl group such as 2-hydroxyethyl acrylate, 2-hydroxypropyl acrylate, 4-hydroxybutyl acrylate, 2-hydroxyethyl methacrylate, 2-hydroxypropyl methacrylate, and 4-hydroxybutyl methacrylate.

It is preferable that the weight average molecular weight of the modified polyolefin resin measured by the GPC method is in a range of 10,000 to 200,000. When the weight average molecular weight is less than 10,000, the cohesion as a primer layer tends to deteriorate. When the weight average molecular weight is more than 200,000, the work efficiency tends to deteriorate because of an increase in viscosity of the coating liquid for primer layer formation.

Any of commercial products described below can be used for the modified polyolefin resin having an acid group. The examples include: "UNISTOL P902" (trade name) manufactured by Mitsui Chemicals, Inc., "HARDLEN" (trade name) manufactured by TOYOBO CO., LTD., "AUROREN" (trade name) manufactured by NIPPON PAPER Chemicals CO., LTD., "SURFLEN" (trade name) manufactured by Mitsubishi Chemical Corporation, "SUMIFITT" (trade name) manufactured by Sumika Chemtex Co., Ltd., and "ZAIKTHENE" (trade name) manufactured by SUMITOMO SEIKA CHEMICALS CO., LTD. Similarly, a commercial product can be used for the modified polyolefin resin having a hydroxyl group. The examples include "UNISTOLE P901" (trade name) manufactured by Mitsui Chemicals, Inc. and "POLYTEL" (trade name) manufactured by Mitsubishi Chemical Corporation.

It is preferable that the primer layer is formed directly on the infrared reflecting layer by coating the coating liquid for primer layer formation on the infrared reflecting layer. Thereby, the adhesiveness between the primer layer and the infrared reflecting layer can be improved further.

Preferably, the primer layer has a thickness in a range of 0.05 μm to 10 μm, and more preferably 0.05 μm to 5 μm. When the thickness is less than 0.05 μm, sufficient adhesion with the infrared reflecting layer cannot be obtained. When the thickness exceeds 10 μm, the haze value is increased or absorption of light of the infrared region wavelength increases depending on the type of the modified polyolefin resin in use or the degree of modification, which may result in an increase in the normal emittance and thermal transmittance.

It is possible to add filler such as an organic or inorganic substance suitable as an anti-blocking agent as long as the absorption of light of the infrared region wavelength does not increase.

For the above-described filler, for example, an inorganic filler or an organic filler can be used in a range not affecting the optical properties such as the whole light transmittance and haze. Examples of the inorganic filler include silica, talc, barium sulfate, calcium carbonate, aluminum hydroxide, aluminum oxide, magnesium hydroxide, magnesium oxide, zinc oxide, titanium oxide, zirconium oxide, mica, and zinc stearate. Examples of the organic filler include silicone resin-based filler, acrylic resin-based filler, styrene resin-based filler, fluororesin-based filler, and polybutadiene resin-based filler.

The filler may be used alone or as a combination of at least two. The average particle diameter of the filler (number mean diameter) is not limited particularly as long as an anti-blocking property can be imparted while the properties and appearance of the transparent heat shielding and insulating member are not affected, but preferably it is in a range of about 0.5 times to 2.0 times the thickness of the primer layer.

<Infrared Reflecting Layer>

It is preferable that the infrared reflecting layer, as described above, is composed of a conductive laminated film. It is further preferable that the conductive laminated film includes at least a metal oxide layer, a metal layer formed of a metal such as silver, copper, gold, platinum, aluminum or the like or an alloy thereof, and the metal oxide layer in this order from the transparent base side, for the purpose of improving the light transmittance in the visible region. By configuring the conductive laminated film with at least three layers as described above, the light transmittance and heat insulating function in the visible region of the transparent heat shielding and insulating member can be improved further. The transparent heat shielding and insulating member may be configured as a multilayered structure of five layers, seven layers or nine layers, such as "metal oxide layer/metal layer/metal oxide layer/metal layer/metal oxide layer" as long as the light transmittance in the visible region does not deteriorate. However, when a constitution of more than nine layers is employed, the light transmittance in the visible region tends to deteriorate.

For the above-described metal oxide layer, metal oxide materials such as indium tin oxide, indium zinc oxide, zinc oxide, titanium oxide, tin oxide, zinc oxide, niobium oxide, and aluminum oxide can be used suitably. The metal oxide layer can be formed by a dry coating process like sputtering or vapor deposition. The thickness of each metal oxide layer may be set in a range of 0.005 μm to 0.1 μm.

The metal layer can be formed of a metal such as silver, copper, gold, platinum, aluminum or an alloy thereof, and specifically the metal layer can be formed by subjecting any of the metals or the alloys to a dry coating process such as sputtering or vapor deposition. The thickness of each metal layer may be adjusted to be in a range of 0.005 μm to 0.1 μm such that both the light transmittance and infrared reflectance in a visible region will be increased.

It is preferable that the average reflectance of light beams having wavelength in a range of 5.5 to 25.2 μm at the infrared reflecting layer is set to be 80% or more. Thereby, the transparent heat shielding and insulating member of the present invention can be provided surely with heat insulating function.

<Transparent Base>

The transparent base for composing the transparent heat shielding and insulating member of the present invention is not limited particularly as long as it is formed of a translucent material. The transparent base can be prepared by processing a resin into a film or a sheet. Examples of the resin include a polyester-based resin (e.g., polyethylene terephthalate, polyethylene naphthalate), a polycarbonate-based resin, a polyacrylate-based resin (e.g., polymethyl methacrylate), an alicyclic polyolefin-based resin, a polystyrene-based resin (e.g., polystyrene, acrylonitrile.styrene copolymer (AS resin) etc.), a polyvinyl chloride-based resin, a polyvinyl acetate-based resin, a polyethersulfone-based resin, a cellulose-based resin (e.g., diacetyl cellulose, triacetyl cellulose etc.), and a norbornene-based resin. Methods for processing the resin into a film or a sheet include extrusion, calendering, compression, injection molding, and a process of dissolving the resin into a solvent and casting. To the resin, an additive such as an antioxidant, a flame retardant, a thermal stabilizer, an ultraviolet absorber, a smoother, and an antistatic agent can be added. The thickness of the transparent base is for example in a range of 10 µm to 500 µm, and preferably 25 µm to 125 µm when taking processability and cost into consideration.

<Cholesteric Liquid Crystal Polymer Layer>

The transparent heat shielding and insulating member of the present invention may also have a cholesteric liquid crystal polymer layer formed on the transparent base opposite to the infrared reflecting layer side, as long as the transparency is not sacrificed. Thereby, the heat shielding function of the transparent heat shielding and insulating member of the present invention can be improved further.

The cholesteric liquid crystal polymer layer can be formed by photo-polymerizing a material including a liquid crystal compound having a polymeric functional group, a chiral agent having a polymeric functional group, and a polyfunctional acrylate compound.

The cholesteric liquid crystal polymer can be obtained by adding a small amount of optically active compound (chiral agent) to a nematic liquid crystal compound that is a rodlike molecule. This cholesteric liquid crystal polymer has a structure of a plurality of layers of nematic liquid crystal compound. Within the layers, the respective nematic liquid crystal compounds are aligned in a certain direction, and the respective layers are accumulated such that the orientations of the liquid crystal compounds are aligned spirally. Therefore, the cholesteric liquid crystal polymer can selectively reflect only light of specific wavelength in accordance with the spiral pitch.

An ordinary cholesteric liquid crystal polymer is characterized in that the spiral pitch changes depending on temperature, and the wavelength of light to be reflected changes. A mixture of a liquid crystal compound having a polymeric functional group and a chiral agent having a polymeric functional group are homogenized in a liquid crystal state and then irradiated with an active energy beam such as UV ray while keeping its liquid crystal state. In this manner, it is possible to produce a layer containing a cholesteric liquid crystal polymer where the orientation of the liquid crystal compound is fixed semi-permanently.

The thus obtained cholesteric liquid crystal polymer layer is capable of fixing the reflection wavelength semi-permanently without a change in the wavelength of reflected light depending on the temperature. Since this cholesteric liquid crystal polymer layer has a cholesteric liquid crystal optical rotatory power, in a case where the rotary direction and wavelength of the circularly polarized light are identical to the rotary direction and spiral pitch of the liquid crystal molecules, the cholesteric liquid crystal layer does not transmit but reflects the light. In general, sunlight is composed of circularly polarized lights of right spirals and left spirals. Therefore, it is possible to further raise the reflectance at a selected reflection wavelength by laminating a cholesteric liquid crystal polymer layer provided with a specific spiral pitch by use of a chiral agent having a right spiral optical rotatory power and a cholesteric liquid crystal polymer layer provided with a specific spiral pitch by use of a chiral agent having a left spiral optical rotatory power.

Preferably, the thickness of the cholesteric liquid crystal polymer layer is not less than 1.5 times and not more than 4.0 times the wavelength for reflecting incident light to the maximum (maximum reflectance wavelength), and more preferably, not less than 1.7 times and not more than 3.0 times the maximum reflectance wavelength. When the thickness of the cholesteric liquid crystal polymer layer is less than 1.5 times the maximum reflectance wavelength, it will be difficult to maintain the orientation of the cholesteric liquid crystal polymer layer, and the optical reflectance may be degraded. When the thickness of the cholesteric liquid crystal polymer layer is more than 4.0 times the maximum reflectance wavelength, the orientation and optical reflectance of the cholesteric liquid crystal polymer layer can be maintained favorably, but the thickness might be increased excessively. The thickness of the cholesteric liquid crystal polymer layer is for example not less than 0.5 µm and not more than 20 µm, preferably not less than 1 µm and not more than 10 µm.

The above-described cholesteric liquid crystal polymer layer is not limited to a single layer constitution, but it may have a structure of a plurality of layers. In a case of a structure of a plurality of layers, it is preferable that the respective layers have different selective reflection wavelengths, since it is possible to increase the wavelength range for reflecting light.

Hereinafter, the materials for forming the cholesteric liquid crystal polymer layer will be described in detail.

[Liquid Crystal Compound Having Polymeric Functional Group]

For forming the cholesteric liquid crystal polymer layer, a liquid crystal compound having a polymeric functional group is used. For the liquid crystal compound, for example, any known compound as described in Chapter 8 of "Basic and Application of Liquid Crystal" (written by Shoichi MATSUMOTO and Ichiro TSUNODA; Industrial Investigation Committee) can be used.

Specific examples of the above-described liquid crystal compound include compounds described in, for example, JP 2012-6997 A, JP 2012-168514 A, JP 2008-217001 A, WO95/22586, JP 2000-281629 A, JP 2001-233837 A, JP 2001-519317 A, JP 2002-533742 A, JP 2002-308832 A, JP 2002-265421 A, JP 2005-309255 A, JP 2005-263789 A, JP 2008-291218 A, and JP 2008-242349 A.

The liquid crystal compound used for forming the cholesteric liquid crystal polymer layer may be used singly. Alternatively, a high-melting point liquid crystal compound and a low-melting point liquid crystal compound may be used together if a use of a single liquid crystal compound may easily cause disorder in the orientation of the cholesteric liquid crystal polymer layer. In such a case, preferably the difference in the melting points between the high-melting point liquid crystal compound and the low-melting point liquid crystal compound is in a range of 15° C. to 30° C., and more preferably in a range of 20° C. to 30° C.

With regard to the above-described liquid crystal compounds, in a case of using the high-melting point liquid crystal compound and the low-melting point liquid crystal compound together, it is preferable that the high-melting point liquid crystal compound has a melting point not lower than a glass transition temperature of the transparent base. If the melting point of the liquid crystal compound is low, the compatibility and solubility with the chiral agent or the solvent are improved. However, when the melting point is excessively low, the produced transparent heat shielding and insulating member will have an inferior heat resistance. For this reason, it is preferable that the melting point of the high-melting point liquid crystal compound is at least equivalent to or higher than the glass transition temperature of the transparent base.

It is possible to use a commercial product for the combination of the high-melting point liquid crystal compound and the low-melting point liquid crystal compound. Examples of the combination include: combinations of products of ADEKA Corporation, such as "PLC7700" (trade name, melting point: 90° C.) and "PLC8100" (trade name, melting point: 65° C.); "PLC7700" (melting point: 90° C.) and "PLC7500" (trade name, melting point: 65° C.); and, a combination of products of DIC Corporation, such as "UCL-017A" (trade name, melting point: 96° C.) and "UCL-017" (trade name, melting point: 70° C.).

In a case where three or more kinds of liquid crystal compounds having polymeric functional groups are used, a compound having the highest melting point among the compounds is regarded as the high-melting point liquid crystal compound, and a compound having the lowest melting point is regarded as the low-melting point liquid crystal compound.

In a case where two or more kinds of the liquid crystal compounds having the polymeric functional groups are used, it is preferable that the high-melting point liquid crystal compound is included in an amount of not more than 90 mass % with respect to the total mass. When the rate of the high-melting point liquid crystal compound is higher than 90 mass %, compatibility of the liquid crystal compound tends to deteriorate, and as a result, orientation of the cholesteric liquid crystal polymer layer experiences partial disorder to cause a rise in the haze.

[Chiral Agent Having Polymeric Functional Group]

For a chiral agent having a polymeric functional group to be used for formation of the above-described cholesteric liquid crystal polymer layer, any conventional chiral agent having a polymeric functional group can be used as long as the chiral agent has a favorable compatibility with the liquid crystal compound and is soluble in a solvent, without any particular limitation on the structure.

Specific examples of the chiral agent include the compounds as described in WO98/00428, JP H09-506088 A, JP H10-509726 A, JP 2000-44451 A, JP 2000-506873 A, JP 2003-66214 A, JP 2003-313187 A, U.S. Pat. No. 6,468,444, and the like. For the chiral agent, commercial products can be used. The examples include: "S101", "R811", and "CB15" (trade name) manufactured by Merck KGaA; "PALIOCOLOR LC756" (trade name) manufactured by BASF; and, "CNL715", and "CNL716" (trade name) manufactured by ADEKA Corporation.

It is possible to control the selective reflection wavelength of the cholesteric liquid crystal polymer layer by adjusting the spiral pitch. This spiral pitch can be controlled by adjusting the blending amounts of the liquid crystal compound and the chiral agent. For example, in a case where the concentration of the chiral agent is high, the torque of the spiral increases, thereby the spiral pitch becomes smaller and the selective reflection wavelength λ of the cholesteric liquid crystal polymer layer is shifted to the short wavelength side. In a case where the concentration of the chiral agent is low, the torque of the spiral decreases, thereby the spiral pitch becomes larger and the selective reflection wavelength λ of the cholesteric liquid crystal polymer layer is shifted to the long wavelength side. Therefore, the blending amount of the chiral agent is preferably 0.1 mass parts or more and 10 mass parts or less, and more preferably 0.2 mass parts or more and 7.0 mass parts or less with respect to 100 mass parts of the total of the liquid crystal compound and the chiral agent. When the blending amount of the chiral agent is 0.1 mass parts or more and 10 mass parts or less, the selective reflection wavelength of the obtained cholesteric liquid crystal polymer layer can be controlled to be within the near infrared region.

By adjusting the blending amount of the chiral agent as described above, it is possible to control the selective reflection wavelength of the cholesteric liquid crystal polymer layer. By controlling the selective reflection wavelength to be within the near infrared region, it is possible to obtain a transparent heat shielding and insulating member that has no substantial absorption in the visible region, i.e., it is transparent in the visible region and is capable of selectively reflecting light of the near infrared region. For example, it is possible to set the maximum reflectance wavelength of the transparent heat shielding and insulating member to be 800 nm or more.

[Polyfunctional Acrylate Compound]

For the polyfunctional acrylate compound to be used for formation of the cholesteric liquid crystal polymer layer as described above, any compound can be used suitably as long as it has a favorable compatibility with the liquid crystal compound and the chiral agent, and it does not cause disorder in the orientation of the cholesteric liquid crystal polymer layer.

The polyfunctional acrylate compound is used to improve the curing property of the liquid crystal compound having a polymeric functional group and the chiral agent having a polymeric functional group, in an amount not to cause disorder in orientation of the cholesteric liquid crystal polymer layer. Specifically, the content of the polyfunctional acrylate compound may be 0.5 mass parts or more and 5 mass parts or less, preferably 1 mass part or more and 3 mass parts or less with respect to 100 mass parts of the total of the liquid crystal compound and the chiral agent.

<Adhesive Layer>

It is preferable to dispose an adhesive layer on the transparent heat shielding and insulating member of the present invention opposite to the protective layer side, thereby the transparent heat shielding and insulating member of the present invention can be stuck easily to a glass substrate (not shown) or the like. For the material of the adhesive layer, for example, resins such as an acrylic resin, a polyester-based resin, a urethane-based resin, a rubber-based resin, a silicone-based resin and the like can be used. The thickness of the adhesive layer may be in a range of 10 to 100 μm.

<Transparent Heat Shielding and Insulating Member>

As the transparent heat shielding and insulating member of the present invention has the above-described primer layer interposed between the infrared reflecting layer and the protective layer, the adhesiveness between the infrared reflecting layer and the protective layer can be improved. Specifically, even after the transparent heat shielding and insulating member is subjected to a weathering test of 1000 hours compliant with JIS A5759, the protective layer has no peeling in a cross-cut adhesion test compliant with JIS D0202-1998.

In a case of sticking the adhesive layer disposed on the side of the transparent base to the glass substrate, the transparent heat shielding and insulating member of the present invention can provide an average reflectance of 70% or more of light having a wavelength in a range of 5.5 to 25.2 μm at the time of measurement while irradiating with light from the side opposite to the glass substrate side. Further, the transparent heat shielding and insulating member of the present invention can provide a haze value of 2% or less.

Further, the transparent heat shielding and insulating member of the present invention can exhibit a heat shielding function and a heat insulating function provided by the infrared reflecting layer, and the protective layer can serve to improve the abrasion resistance. Furthermore, by disposing the cholesteric liquid crystal polymer layer, it is possible to improve further the heat shielding function of the transparent heat shielding and insulating member of the present invention.

The transparent heat shielding and insulating member of the present invention can be shaped as a film or a sheet and stuck to a glass substrate or the like in use, though the present invention is not limited to this aspect.

Next, an example of a method for producing the transparent heat shielding and insulating member of the present invention will be explained with reference to FIG. 1.

First, an infrared reflective layer 12 is formed on one surface of a transparent base 11. The infrared reflecting layer 12 can be formed by sputtering a conductive material for example, though this example is not limitative. From the viewpoint of heat insulating function, preferably the infrared reflecting layer 12 has a structure of three layers, i.e., a high-refractive conductive layer, a low-refractive conductive layer, and a high-refractive conductive layer.

Next, a coating liquid for primer layer formation is applied on the infrared reflecting layer 12, thereby forming a primer layer 13.

Next, a coating liquid for protective layer formation is applied on the primer layer 13 and cured to form a protective layer 14. Thereby, even when the infrared reflecting layer 12 is disposed on the side facing the interior of a room, the infrared reflecting layer 12 can be prevented from being damaged due to wiping or the like.

It is preferable that the protective layer is formed on a primer layer 13 by applying a coating liquid for protective layer formation including an ionizing radiation curable resin oligomer having a weight average molecular weight in a range of 10,000 to 100,000 and later by irradiating with ionizing radiation. Thereby, as described above, it is possible to improve the coating property of the coating liquid for protective layer formation and to improve the abrasion resistance of the formed protective layer.

Lastly, an adhesive layer 15 is formed on the other surface of the transparent base 11. There is no particular limitation on the method for forming the adhesive layer 15. An adhesive may be applied directly on the outer surface of the transparent base 11, or an adhesive sheet that has been prepared separately may be stuck thereon.

An example of the transparent heat shielding and insulating member of the present invention can be obtained by the above-described process. After that, it is stuck to a glass substrate or the like to be used.

Hereinafter, the present invention is explained in detail with reference to Examples. However, the present invention is not limited to these Examples. Hereinafter, "part" indicates "mass part" unless otherwise specified.

Example 1

Production of Transparent Base with Infrared Reflecting Layer

First, as a transparent base, a polyethylene terephthalate (PET) film "A4100" (trade name, thickness: 50 µm) manufactured by TOYOBO CO., LTD. was prepared. The PET film had a surface treated to facilitate adherence. Next, on the surface of the above-described PET film that had been treated to facilitate adherence, a conductive laminated film (infrared reflecting layer) of a three-layered structure of an ITO (indium-tin oxide) layer having a thickness of 30 nm, a silver layer having a thickness of 10 nm, and an ITO layer having a thickness of 30 nm was formed by sputtering, thereby a transparent base with an infrared reflecting layer was produced.

<Formation of Primer Layer>

10 parts of modified polyolefin resin solution "HARDLEN NS-2002" (trade name, acid modification type, solid concentration: 20 mass %) manufactured by TOYOBO CO., LTD. was blended with 80 parts of methylcyclohexane and 20 parts of methyl isobutyl ketone as dilution solvents by use of a disperser, thereby preparing a coating liquid A for primer layer formation. Next, the coating liquid A for primer layer formation was coated to have a thickness of 0.1 µm on the infrared reflecting layer by use of a micro-gravure coater and dried, thereby forming a primer layer on the infrared reflecting layer.

<Formation of Protective Layer>

125 parts of an ionizing radiation curable resin oligomer "BPZA-66" (trade name, solid concentration: 80 mass %, weight average molecular weight: 20,000) manufactured by Kyoeisha Chemical Co., Ltd., 3 parts of photoinitiator "Irgacure 819" (trade name) manufactured by BASF, and 375 parts of methyl isobutyl ketone were blended by use of a disperser, thereby preparing a coating liquid A for protective layer formation. Next, the coating liquid A for protective layer formation was coated to have a thickness of 1 µm on the primer layer by use of a micro-gravure coater, cured by irradiating with UV ray of luminous energy of 300 mJ/cm$^2$ by use of a high-pressure mercury lamp, thereby forming a protective layer on the primer layer.

In this manner, an infrared reflecting film (transparent heat shielding and insulating member) was produced.

<Formation of Adhesive Layer>

First, a PET film "NS-38+A" (trade name, thickness: 38 µm) manufactured by Nakamoto Packs Co., Ltd. with one surface thereof being silicone-treated was prepared. 1.25 parts of a UV absorber (benzophenone) manufactured by Waco Pure Chemical Industries Ltd. and 0.27 parts of a crosslinking agent "E-AX" (trade name, solid: 5%) manufactured by Soken Chemicals & Engineering Co., Ltd. were added to 100 parts of an acrylic adhesive "SK-Dyne 2094" (trade name, solid: 25 mass %) manufactured by Soken Chemicals & Engineering Co., Ltd., which were blended by use of a disperser, thereby preparing a coating liquid for adhesive layer formation.

Next, on the silicone-treated surface of the PET film, the coating liquid for adhesive layer formation was applied so that the thickness after drying would be 25 µm, which was dried and then an adhesive layer was formed. Further, a surface of the infrared reflecting film not having the infrared reflecting layer was stuck to the upper surface of this adhesive layer so as to produce an infrared reflecting film with an adhesive layer.

<Sticking to Glass Substrate>

First, for a glass substrate, a float glass sheet having a thickness of 3 mm (manufactured by Nippon Sheet Glass) was prepared. Next, the PET film was peeled off from the infrared reflecting film with an adhesive layer, and the adhesive layer side of the infrared reflecting film was stuck to the float glass.

Example 2

An infrared reflecting film was produced in the same manner as Example 1 except that the thickness of the protective layer of Example 1 was modified to 2 µm, and the film was stuck to a glass substrate.

Example 3

An infrared reflecting film was produced in the same manner as Example 1 except that the thickness of the protective layer of Example 1 was modified to 0.5 µm, and the film was stuck to a glass substrate.

Example 4

10 parts of a modified polyolefin resin solution "UNISTOLE P902" (trade name, acid modification type, solid concentration: 22 mass %) manufactured by Mitsui Chemicals was blended with 80 parts of methylcyclohexane and 20 parts of methyl isobutyl ketone as dilution solvents by use of a disperser, thereby preparing a coating liquid B for primer layer formation. An infrared reflecting film was produced in the same manner as Example 1 except that the above-described coating liquid B for primer layer formation was used, and the film was stuck to a glass substrate.

Example 5

200 parts of an ionizing radiation curable resin oligomer "Acrit 8BR-930" (trade name, solid concentration: 50 mass %, weight average molecular weight: 16,000) manufactured by Taisei Fine Chemical Co., Ltd., 3 parts of photoinitiator "Irgacure 819" and 300 parts of methyl isobutyl ketone were blended by use of a disperser, thereby preparing a coating liquid B for protective layer formation. An infrared reflecting film was produced in the same manner as Example 1 except that the above-described coating liquid B for protective layer formation was used, and the film was stuck to a glass substrate.

Example 6

An infrared reflecting film was produced in the same manner as Example 1 except that a cholesteric liquid crystal polymer layer was formed on a surface of the transparent base opposite to the protective layer (i.e., a surface of the PET film not being treated to facilitate adherence) after formation of the protective layer of Example 1, and the film was stuck to a glass substrate.
<Formation of Cholesteric Liquid Crystal Polymer Layer>
Materials as described below were mixed by stirring so as to prepare a coating liquid for cholesteric liquid crystal polymer layer formation:
(1) 86.4 parts of liquid crystal compound I having a polymeric functional group (manufactured by ADEKA Corporation, high-melting point liquid crystal compound with trade name of "PLC-7700", melting point: 90° C.);
(2) 9.6 parts of liquid crystal compound II having a polymeric functional group (manufactured by ADEKA Corporation, low-melting point liquid crystal compound with trade name of "PLC-8100", melting point: 65° C.);
(3) 4.0 parts of chiral agent (manufactured by ADEKA Corporation, dextrorotatory chiral agent, trade name: "CNL-715");
(4) 1.5 parts of polyfunctional acrylate compound (manufactured by Kyoeisha Chemical Co., Ltd., trade name: "Light Acrylate PE-3A");
(5) 3.0 parts of photoinitiator (manufactured by BASF, trade name: "Irgacure 819"); and
(6) 464 parts of solvent (cyclohexane).

The coating liquid for cholesteric liquid crystal polymer layer formation was applied by using a micro-gravure coater on a surface of the infrared reflecting film opposite to the surface provided with the infrared reflecting layer produced in Example 1, dried at 100° C. to form a coating film. The coating film was irradiated with UV ray (wavelength: maximal wavelength of 365 nm, light source: high-pressure mercury lamp, luminous energy: 500 mJ/cm$^2$) for 30 seconds so as to cure the coating film, thereby forming a dextrorotatory cholesteric liquid crystal polymer layer (thickness: 3 µm). This dextrorotatory cholesteric liquid crystal polymer layer had a central reflection wavelength of 890 nm.

Example 7

100 parts of ionizing radiation curable resin monomer "KAYARAD DPHA" (trade name, molecular weight: 578) manufactured by Nippon Kayaku Co., Ltd., 3 parts of photoinitiator "Irgacure 819" and 400 parts of methyl isobutyl ketone were blended by use of a disperser, thereby preparing a coating liquid C for protective layer formation. An infrared reflecting film was produced in the same manner as Example 1 except that the above-described coating liquid C for protective layer formation was used, and the film was stuck to a glass substrate.

Example 8

An infrared reflecting film was produced in the same manner as Example 1 except that the thickness of the protective layer of Example 1 was modified to 3 µm, and the film was stuck to a glass substrate.

Example 9

250 parts of an ionizing radiation curable resin oligomer "Acrit 8BR-500", (trade name, solid concentration: 37 mass %, weight average molecular weight: 250,000) manufactured by Taisei Fine Chemical Co., Ltd., 3 parts of photoinitiator "Irgacure 819" and 250 parts of methyl isobutyl ketone were blended by use of a disperser, thereby preparing a coating liquid D for protective layer formation. An infrared reflecting film was produced in the same manner as Example 1 except that the above-described coating liquid D for protective layer formation was used, and the film was struck to a glass substrate.

Example 10

For a coating liquid E for protective layer formation, an alkoxysilane-based hard coat agent "SHC-900" (trade name, solid concentration: 30 mass %), which is a thermosetting resin manufactured by Momentive Performance Materials Japan LLC, was prepared. Next, the coating liquid E for protective layer formation was applied to have a thickness of 1 µm on the primer layer of Example 1 by use of a micro-gravure coater, dried at 120° C. for 3 minutes, thereby forming a protective layer on the primer layer. An infrared reflecting film was produced in the same manner as Example 1 except for the above-described process, and the film was stuck to a glass substrate.

Example 11

An infrared reflecting film was produced in the same manner as Example 1 except that the thickness of the primer layer of Example 1 was modified to 0.05 µm, and the film was stuck to a glass substrate.

Example 12

An infrared reflecting film was produced in the same manner as Example 1 except that the thickness of the primer layer of Example 1 was modified to 10 µm, and the film was stuck to a glass substrate.

Example 13

An infrared reflecting film was produced in the same manner as Example 1 except that the thickness of the primer layer of Example 1 was modified to 0.04 µm, and the film was stuck to a glass substrate.

Example 14

An infrared reflecting film was produced in the same manner as Example 1 except that the thickness of the primer layer of Example 1 was modified to 11 µm, and the film was stuck to a glass substrate.

Example 15

10 parts of modified polyolefin resin solution "UNISTOLE P901" (trade name, hydroxyl group modification type, solid concentration: 22 mass %) manufactured by Mitsui Chemicals was blended with 80 parts of methylcyclohexane and 20 parts of methyl isobutyl ketone as dilution solvents by use of a disperser, thereby preparing a coating liquid C for primer layer formation. An infrared reflecting film was produced in the same manner as Example 1 except that the above-described coating liquid C for primer layer formation was used, and the film was stuck to a glass substrate.

Example 16

An infrared reflecting film was produced in the same manner as Example 1 except that the thickness of the protective layer of Example 1 was modified to 2.5 µm, and the film was stuck to a glass substrate.

Comparative Example 1

An infrared reflecting film was produced in the same manner as Example 1 except that a primer layer was not present, and the film was stuck to a glass substrate.

Comparative Example 2

125 parts of ionizing radiation curable resin oligomer "BPZA-66", 5 parts of di-2-methacryloxyethylphosphate "KAYAMAER PM-2" (trade name), which is a (meth)acrylate compound having a phosphate group manufactured by Nippon Kayaku Co., Ltd., 3 parts of photoinitiator "Irgacure 819", and 375 parts of methyl isobutyl ketone were blended by use of a disperser, thereby preparing a coating liquid F for protective layer formation, without disposing a primer layer. Next, the coating liquid F for protective layer formation was coated to have a thickness of 1 µm on the infrared reflecting layer of Example 1 by use of a micro-gravure coater, cured by irradiating with UV ray of a luminous energy of 300 mJ/cm$^2$ by use of a high-pressure mercury lamp. Thereby, an infrared reflecting film was produced in the same manner as Example 1 except that a protective layer was formed on the infrared reflecting layer without a primer layer disposed therebetween, and the film was stuck to a glass substrate.

Comparative Example 3

An infrared reflecting film was produced in the same manner as Example 1 except that neither a protective layer nor a primer layer was present, and the film was stuck to a glass substrate.

Comparative Example 4

2 parts of cyclopolyolefin resin "ZEONOR" (trade name, non-modification type) manufactured by ZEON CORPORATION and 100 parts of cyclooctane as a solvent were blended by use of a disperser, thereby preparing a coating liquid D for primer layer formation. An infrared reflecting film was produced in the same manner as Example 1 except that the above-described coating liquid D for primer layer formation was used, and the film was stuck to a glass substrate.

<Evaluation of Transparent Heat Shielding and Insulating Member>

Regarding the above-described Examples 1-16 and Comparative Examples 1-4, visible light transmittance, haze, normal emittance, shading coefficient, and thermal transmittance of the infrared reflecting films in a state being stuck to glass substrates were measured in the following manner. In addition to that, the initial adhesion, the adhesion after weathering test and abrasion resistance of the protective layers were evaluated, and furthermore, the appearance of each of the infrared reflecting film was observed.

[Visible Light Transmittance]

In a state where the glass substrate side is set to be the incident side, the spectral transmittance was measured in a range of 380 to 780 nm by use of an ultraviolet-visible-near infrared spectrometer "Ubest V-570 model" (trade name) manufactured by JASCO Corporation, and the visible light transmittance in a state being stuck to a glass substrate was calculated on the basis of JIS A5759.

[Haze]

In a state where the glass substrate side is set to be the incident side, the haze value was measured on the basis of JIS K7136 by use of a haze meter "NDH-2000" (trade name) manufactured by NIPPON DENSHOKU INDUSTRIES Co., Ltd.

[Normal Emittance]

An attachment for regular reflection measurement was attached to an infrared spectrometer "IR Prestige21" (trade name) manufactured by Shimadzu Corporation, so that spectral reflectance for the infrared reflecting layer side of the infrared reflecting film was measured in a range of 5 to 25.2 µm. Based on this measurement, the normal emittance was calculated in compliance with JIS R3106.

[Shading Coefficient]

In a state where the glass substrate side is set to be the incident side, the spectral transmittance and the spectral reflectance were measured in a range of 300 to 2500 nm by use of the above-described ultraviolet-visible-near infrared spectrometer "Ubest V-570 model". Based on these values, a solar radiation transmittance and a solar radiation reflectance were calculated in compliance with JIS A5759, and a normal emittance was calculated in compliance with JIS R3016. From the values of the solar radiation transmittance, the solar radiation reflectance and the normal emittance, a shading coefficient of the infrared reflecting film in a state being stuck to a glass plate was calculated.

[Thermal Transmittance]

An attachment for regular reflection measurement was attached to the above-described infrared spectrometer "IR Prestige21", so that spectral reflectances for the infrared reflecting layer side and the glass substrate side of the infrared reflecting film were measured in a range of 5 to 25.2 µm. Based on these measurement results, the normal emittances for the infrared reflecting layer side and the glass substrate side of the infrared reflecting film were calculated in compliance with JIS R3106. Based on the results, a thermal transmittance of the infrared reflecting film was calculated in compliance with JIS A5759.

[Initial Adhesion of Protective Layer]

Regarding the protective layer side of the infrared reflecting film provided with a protective layer, a cross-cut tape peeling test was conducted in compliance with JIS D0202-1988. Specifically, an adhesive cellophane tape (scotch tape) "CT24" (trade name) manufactured by NICHIBAN CO., LTD. was used. The tape was adhered to the protective layer with the ball of a finger (finger cushion) and later peeled off for evaluation of the adhesion. The evaluation was expressed as the number of squares at unpeeled parts among 100 squares. A case where the protective layer does not peel at all is expressed as 100/100, and a case where the protective layer peels off completely is expressed as 0/100.

[Adhesion of Protective Layer after Weathering Test]

An infrared reflecting film is subjected to a weathering test by being irradiated by use of a sunshine carbon arc lamp for 1000 hours in compliance with JIS A5759, and later the adhesion was evaluated in the same manner as the initial adhesion.

[Abrasion Resistance]

Steel wool (#0000) manufactured by BONSTAR SALES Co., Ltd. was placed on the surface of the infrared reflecting film at the infrared reflecting layer side, and the steel wool was made reciprocate ten times in a state being applied with a weight of 250 g/cm$^2$. Later, the surface condition of the infrared reflecting film was observed visually and classified into the three levels below.

A: there is no flaw or scratch;
B: several (at most five) flaws or scratches are found;
C: many flaws or scratches are found.

[Appearance]

The appearance of the infrared reflecting film was observed visually, and classified into the three levels below.

A: there is no cissing etc. on the entire surface of protective layer, and the coating is uniform;
B: deficiency in appearance such as cissing etc. is found in a part of protective layer;
C: deficiency in appearance such as cissing etc. is found in the entire surface of protective layer.

Tables 1-3 show the above-mentioned results with the types of coating liquid for protective layer formation and coating liquid for primer layer formation, thickness of protective layer, thickness of primer layer and layer constitution of a transparent heat shielding and insulating member stuck to a glass substrate.

TABLE 1

|  | Example 1 | Example 2 | Example 3 | Example 4 | Example 5 | Example 6 | Example 7 |
|---|---|---|---|---|---|---|---|
| Coating liquid for protective layer formation | Coating liquid A | Coating liquid A | Coating liquid A | Coating liquid A | Coating liquid B | Coating liquid A | Coating liquid C |
| Coating liquid for primer layer formation | Coating liquid A | Coating liquid A | Coating liquid A | Coating liquid B | Coating liquid A | Coating liquid A | Coating liquid A |
| Protective layer thickness (µm) | 1 | 2 | 0.5 | 1 | 1 | 1 | 1 |
| Primer layer thickness (µm) | 0.1 | 0.1 | 0.1 | 0.1 | 0.1 | 0.1 | 0.1 |
| Layer constitution | Protective layer Primer layer Infrared reflecting layer Transparent base Adhesive layer | Protective layer Primer layer Infrared reflecting layer Transparent base Adhesive layer | Protective layer Primer layer Infrared reflecting layer Transparent base Adhesive layer | Protective layer Primer layer Infrared reflecting layer Transparent base Adhesive layer | Protective layer Primer layer Infrared reflecting layer Transparent base Adhesive layer | Protective layer Primer layer Infrared reflecting layer Transparent base Cholesteric liquid crystal polymer layer Adhesive layer | Protective layer Primer layer Infrared reflecting layer Transparent base Adhesive layer |
|  | Glass substrate | Glass substrate | Glass substrate | Glass substrate | Glass substrate | Glass substrate | Glass substrate |
| Visible light transmittance (%) | 71.3 | 70.7 | 70.6 | 71.1 | 70.9 | 72.2 | 70.8 |
| Haze (%) | 0.35 | 0.40 | 0.34 | 0.35 | 0.42 | 0.67 | 0.40 |
| Normal emittance | 0.18 | 0.27 | 0.10 | 0.19 | 0.21 | 0.19 | 0.19 |
| Shading coefficient | 0.53 | 0.54 | 0.55 | 0.53 | 0.54 | 0.51 | 0.54 |
| Thermal transmittance (W/m$^2$ · K) | 4.0 | 4.3 | 3.8 | 4.0 | 4.1 | 4.0 | 4.0 |
| Initial adhesion | 100/100 | 100/100 | 100/100 | 100/100 | 100/100 | 100/100 | 100/100 |
| Adhesion after weathering test | 100/100 | 100/100 | 100/100 | 100/100 | 100/100 | 100/100 | 100/100 |
| Abrasion resistance | A | A | A | A | B | A | B |
| Appearance | A | A | A | A | A | A | B |

TABLE 2

|  | Example 8 | Example 9 | Example 10 | Example 11 | Example 12 | Example 13 | Example 14 |
|---|---|---|---|---|---|---|---|
| Coating liquid for protective layer formation | Coating liquid A | Coating liquid D | Coating liquid E | Coating liquid A | Coating liquid A | Coating liquid A | Coating liquid A |
| Coating liquid for primer layer formation | Coating liquid A | Coating liquid A | Coating liquid A | Coating liquid A | Coating liquid A | Coating liquid A | Coating liquid A |
| Protective layer thickness (μm) | 3 | 1 | 1 | 1 | 1 | 1 | 1 |
| Primer layer thickness (μm) | 0.1 | 0.1 | 0.1 | 0.05 | 10 | 0.04 | 11 |
| Layer constitution | Protective layer Primer layer Infrared reflecting layer Transparent base Adhesive layer Glass substrate | Protective layer Primer layer Infrared reflecting layer Transparent base Adhesive layer Glass substrate | Protective layer Primer layer Infrared reflecting layer Transparent base Adhesive layer Glass substrate | Protective layer Primer layer Infrared reflecting layer Transparent base Adhesive layer Glass substrate | Protective layer Primer layer Infrared reflecting layer Transparent base Adhesive layer Glass substrate | Protective layer Primer layer Infrared reflecting layer Transparent base Adhesive layer Glass substrate | Protective layer Primer layer Infrared reflecting layer Transparent base Adhesive layer Glass substrate |
| Visible light transmittance (%) | 70.9 | 70.9 | 71.2 | 71.4 | 70.8 | 71.4 | 70.7 |
| Haze (%) | 0.51 | 0.36 | 0.36 | 0.33 | 0.51 | 0.33 | 0.57 |
| Normal emittance | 0.33 | 0.19 | 0.21 | 0.18 | 0.29 | 0.18 | 0.31 |
| Shading coefficient | 0.55 | 0.54 | 0.54 | 0.53 | 0.53 | 0.53 | 0.54 |
| Thermal transmittance (W/m² · K) | 4.6 | 4.0 | 4.1 | 4.0 | 4.4 | 4.0 | 4.5 |
| Initial adhesion | 100/100 | 100/100 | 100/100 | 100/100 | 100/100 | 88/100 | 100/100 |
| Adhesion after weathering test | 100/100 | 100/100 | 100/100 | 100/100 | 100/100 | 81/100 | 100/100 |
| Abrasion resistance | A | B | B | A | A | B | A |
| Appearance | A | A | A | A | A | A | A |

TABLE 3

|  | Example 15 | Example 16 | Comparative Example 1 | Comparative Example 2 | Comparative Example 3 | Comparative Example 4 |
|---|---|---|---|---|---|---|
| Coating liquid for protective layer formation | Coating liquid A | Coating liquid A | Coating liquid A | Coating liquid F | — | Coating liquid A |
| Coating liquid for primer layer formation | Coating liquid C | Coating liquid A | — | — | — | Coating liquid D |
| Protective layer thickness (μm) | 1 | 2.5 | 1 | 1 | — | 1 |
| Primer layer thickness (μm) | 0.1 | 0.1 | — | — | — | 0.1 |
| Layer constitution | Protective layer Primer layer Infrared reflecting layer Transparent base Adhesive layer Glass substrate | Protective layer Primer layer Infrared reflecting layer Transparent base Adhesive layer Glass substrate | Protective layer Infrared reflecting layer Transparent base Adhesive layer Glass substrate | Protective layer Infrared reflecting layer Transparent base Adhesive layer Glass substrate | Infrared reflecting layer Transparent base Adhesive layer Glass substrate | Protective layer Primer layer Infrared reflecting layer Transparent base Adhesive layer Glass substrate |
| Visible light transmittance (%) | 70.7 | 70.5 | 70.4 | 70.3 | 77.4 | 71.5 |
| Haze (%) | 0.38 | 0.41 | 0.33 | 0.34 | 0.29 | 0.34 |
| Normal emittance | 0.19 | 0.30 | 0.18 | 0.18 | 0.08 | 0.17 |
| Shading coefficient | 0.54 | 0.54 | 0.53 | 0.53 | 0.57 | 0.53 |
| Thermal transmittance (W/m² · K) | 4.0 | 4.4 | 4.0 | 4.0 | 3.7 | 4.0 |
| Initial adhesion | 95/100 | 100/100 | 0/100 | 100/100 | — | 0/100 |
| Adhesion after weathering test | 91/100 | 100/100 | 0/100 | 20/100 | — | 0/100 |
| Abrasion resistance | B | A | B | A | C | C |
| Appearance | A | A | A | A | — | A |

As shown in Tables 1-3, the transparent heat shielding and insulating member in each of Examples 1-6, 11, 12 and 16 had normal emittance of not more than 0.3. The shading coefficient and the thermal transmittance are low. Namely, both the heat-shielding property in summer and the heat insulation property in winter are excellent, and the protective layers are excellent in adhesion and abrasion resistance. Further, in the transparent heat shielding and insulating member in each of Examples 1-6, 11, 12 and 16, the ionizing radiation curable resin oligomer used for the protective layer formation has a weight average molecular weight in a range of 10,000 to 100,000, i.e., it is relatively large, and thus the film formability on a primer layer formed of the modified polyolefin resin was excellent, and any particular problem was not found in the appearance. Furthermore, in Example 6 where a cholesteric liquid crystal polymer was provided, the shading coefficient and the visible light transmittance were superior to those of Example 1 where the cholesteric liquid crystal polymer was not provided.

In Example 7, since an ionizing radiation curable resin monomer with a smaller molecular weight was used for protective layer formation, wettability to the primer layer formed of the modified polyolefin resin was inferior. As a result, cissing was found in one part of the protective layer and the film formability was slightly inferior. In Example 8, since the protective layer was as thick as 3 μm, the normal emittance and the thermal transmittance were slightly higher. In Example 9, since a high-molecular weight ionizing radiation curable resin oligomer having a weight average molecular weight of more than 100,000 was used for formation of a protective layer, the crosslinking density of the protective layer was lowered, and the abrasion resistance was slightly inferior. In Example 10, since a thermosetting resin was used for formation of the protective layer, the abrasion resistance was slightly inferior.

In Example 13 where the thickness of the primer layer was decreased to 0.04 μm, the adhesion of the protective layer was slightly inferior in comparison with Example 1 and Example 11. In contrast, in Example 14 where the thickness of the primer layer was increased to 11 μm, the normal emittance was slightly increased in comparison with Example 1 and Example 12, specifically the normal emittance was more than 0.3, and the thermal transmittance also seems to have increased slightly to 4.5. In Example 15, since a modified polyolefin resin of a hydroxyl group modification type was used for the primer layer, the effect of interaction with the infrared reflecting layer was slightly weak in comparison with a case of a modified polyolefin resin of acid modification type, and thus the adhesion and abrasion resistance of the protective layer were slightly inferior.

In Comparative Example 1, since a primer layer was not interposed between the protective layer and the infrared reflecting layer, the protective layer did not exhibit adhesion. In Comparative Example 2, a material having a phosphate group was added to the material for forming a protective layer. In the initial state, the protective layer exhibited adhesion due to the interaction with the metal oxide layer used in the infrared reflecting layer, but in a check of adhesion after the weathering test, partial peeling of the protective layer was found. The reason is considered as follows. Namely, due to a long-time exposure to light during the weathering test, shrinkage by curing of the protective layer proceeded to degrade the adhesion. This could cause problems in a long-time practical use of the transparent heat shielding and insulating member. In Comparative Example 3, since neither a protective layer nor a primer layer was provided, abrasion resistance was not imparted at all, and thus, when the transparent heat shielding and insulating member is processed and used as a windowpane or the like, there is apprehension that scratches or flaws can occur easily due to friction at the time of cleaning or the like. Further in Comparative Example 4, since a cyclopolyolefin resin having no functional group was used for the primer layer, the protective layer did not exhibit either adhesion or abrasion resistance at all.

The present invention can provide a transparent heat shielding and insulating member having a protective layer with excellent abrasion resistance and adhesion and having excellent heat shielding function and heat insulating function. Therefore, when the transparent heat shielding and insulating member of the present invention is applied to a windowpane or the like, the heat shielding property in summer and the heat insulation property in winter are excellent, and both the abrasion resistance and adhesion are high, resulting in excellent utility and durability.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A transparent heat shielding and insulating member comprising a transparent base and a functional layer formed on the transparent base, wherein
   the functional layer comprises an infrared reflecting layer, a primer layer and a protective layer formed of an ionizing radiation curable resin, resin, the layers in direct contact with each other in this order from the transparent base side,
   the infrared reflecting layer comprises a metal oxide layer, a metal layer, and a metal oxide layer in this order,
   each of the metal oxide layers has a thickness in a range of 0.005 μm to 0.1 μm,
   the metal layer has a thickness in a range of 0.005 μm to 0.1 μm,
   the primer layer is formed of a modified polyolefin resin having either an acid group or a hydroxyl group,
   the acid group of the modified polyolefin resin is derived from at least one selected from α,β-unsaturated carboxylic acid and an acid anhydride thereof,
   the hydroxyl group of the modified polyolefin resin is derived from a (meth)acrylic acid-based monomer containing a hydroxyl group,
   a weight average molecular weight of the modified polyolefin resin measured by GPC is in a range of 10,000 to 200,000,
   the primer layer has a thickness in a range of 0.04 μm to 11 μm,
   the protective layer has a thickness in a range of 0.1 μm to 2.5 μm,
   the ionizing radiation curable resin forming the protective layer is formed of an ionizing radiation curable resin oligomer, and
   a weight average molecular weight of the ionizing radiation curable resin oligomer measured by GPC is in a range of 10,000 to 100,000.

2. The transparent heat shielding and insulating member according to claim 1, wherein a normal emittance at the protective layer side in compliance with JIS R3106 is not more than 0.3.

3. The transparent heat shielding and insulating member according to claim 1, wherein the primer layer has a thickness in a range of 0.05 μm to 10 μm.

4. The transparent heat shielding and insulating member according to claim 1, wherein the primer layer is formed directly on the infrared reflecting layer.

5. The transparent heat shielding and insulating member according to claim 1, wherein after a weathering test of 1000 hours in compliance with JIS A5759, the protective layer has no peeling in a cross-cut adhesion test in compliance with JIS D0202-1998.

6. The transparent heat shielding and insulating member according to claim 1, wherein a cholesteric liquid crystal polymer layer is formed further on a surface of the transparent base opposite to the infrared reflecting layer side.

* * * * *